(12) United States Patent
Miller

(10) Patent No.: US 6,915,471 B2
(45) Date of Patent: Jul. 5, 2005

(54) ENCODER AND METHOD FOR ENCODING DATA

(75) Inventor: Peter Miller, Shefford (GB)

(73) Assignee: Motorola, Inc., Schaumburg, IL (US)

( * ) Notice: Subject to any disclaimer, the term of this patent is extended or adjusted under 35 U.S.C. 154(b) by 476 days.

(21) Appl. No.: 10/144,366

(22) Filed: May 13, 2002

(65) Prior Publication Data

US 2003/0002669 A1 Jan. 2, 2003

(30) Foreign Application Priority Data

Jun. 29, 2001 (GB) .............................. 0116039

(51) Int. Cl.[7] .............................................. G01R 31/28
(52) U.S. Cl. ...................... 714/738; 714/739; 714/758; 714/807
(58) Field of Search ................................ 714/724, 738, 714/739, 744, 758, 807, 819, 728, 735

(56) References Cited

U.S. PATENT DOCUMENTS

| | | | |
|---|---|---|---|
| 3,622,984 A | | 11/1971 | Eastman |
| 4,222,514 A | * | 9/1980 | Bass ........................ 714/739 |
| 4,473,902 A | * | 9/1984 | Chen ........................ 714/759 |
| 4,964,126 A | | 10/1990 | Musicus et al. |
| 5,247,524 A | | 9/1993 | Callon |
| 5,577,053 A | * | 11/1996 | Dent ........................ 714/755 |
| 5,598,530 A | | 1/1997 | Nagae |
| 5,870,476 A | | 2/1999 | Fischer |
| 6,061,703 A | * | 5/2000 | DeBellis et al. ............ 708/254 |
| 6,134,684 A | * | 10/2000 | Baumgartner et al. ...... 714/724 |
| 6,625,229 B2 | * | 9/2003 | Dress et al. ................ 375/295 |
| 6,625,234 B1 | * | 9/2003 | Cui et al. ................... 375/341 |

OTHER PUBLICATIONS

Barr, Michael: Internet Appliance Design, For the Love of the Game, http://www.embedded.com/internet/9912/9912connect.htm, ESP Dec. 1999—Connecting . . .—For the Love of the Game, pp. 1–7.

Barr, Michael: Error Protection, Protecting data: CRCs for embedded systems, Embedded Systems May 2000, pp. 59–70.

Barr, Michael: Networks, Checking data streams in communications, Embedded Systems Programming Europe Dec. 1999/Jan. 2000, pp. 37–43.

Morgantown Personal Rapid Transit System Computer Upgrade . . . :Alternative Definition, 3. Alternatives Definition, http://www.fta.dot.gov/library/technology/personal-transit/alternative>definition.html, Mar. 15, 2001, pp. 1–10.

Safety success leads to follow–on order, Plant safety systems from ICS Triplex, http://www.engineeringtalk.com/news/ics/ics103.html, Feb. 4, 2000, ICS Triplex, Maldon, Essex, UK, pp. 1–2.

http://www.ece.concordia.ca/~jerry/notes/coding_html, Digital Data Transmission, Coding, pp. 1–13.

* cited by examiner

*Primary Examiner*—Phung My Chung
(74) *Attorney, Agent, or Firm*—Thomas V. Miller; Brian M. Mancini

(57) ABSTRACT

An encoder (10,30) and method for encoding data comprising a pseudo random number generator (12) for generating an array of pseudo random numbers (15), and calculating means (10,30) for calculating a checkword (11,23,25) using the array of pseudo random numbers generated and a data sequence provided by a data unit (13).

14 Claims, 1 Drawing Sheet

ENCODER AND METHOD FOR ENCODING DATA

FIELD OF THE INVENTION

The present invention relates generally to an encoder and a method of encoding data. More specifically, the invention relates to error detection systems and methods, for example, systems and methods utilizing checksum including cyclic redundancy check (CRC) techniques.

BACKGROUND OF THE DISCLOSURE

Data communicated and transferred digitally from one unit to another unit in a data system, may become lost or corrupted. Data error detection methods and systems are used to attempt to automatically detect errors in the received data. Some error detection methods utilize checksum including checksum based on addition and checksums based on cyclic redundancy check (CRC) techniques, both of which are discussed by way of example in a series of three articles by Barr, M., "Embedded Systems", 12/1999 pp37–43, 1/2000 pp 37–43, and 5/2000 pp 59–70.

Both checksum and CRC techniques involve calculating and generating a "checkword" at the unit transmitting a string of data. The transmitted checkword is representative of the data sent and is appended to the string of data sent by the unit transmitting the data. On reception of the data string, a second checkword is calculated at the receiving unit performing the same calculations conducted at the transmitting unit based on the data string actually received. The second checkword is then compared with the actual transmitted checkword received. If the two checkwords match, then the probability of data loss or corruption during transmission is low, and the data string is regarded correct. If on comparison the second checkword differs from the transmitted checkword, an indication that the data string sent has been corrupted during transmission is recognized. In such cases the receiving unit may for example request to have the data resent, correct the data, or ignore the data and wait to receive additional data from a transmitting unit.

A typical checksum generates the checkword based on a sum of bytes approach, which involves purely addition functions, the sum of data taken over a unit at a time. The checksum approach is commonly used because it is relatively easy to implement, and can be executed relatively quickly. However, there are problems associated with these type of checksums. A problem arises if there are simple faults in the received data sequence, for example, the order of the data in the data sequence is changed during transmission, the checkword and checksum is unchanged. Another problem with these checksums arises if the entire data sequence or string received at the receiving unit was of all zeros. In both conditions, the first checkword calculated at the transmitting unit would match the second checkword calculated at the receiving unit using the checksum based on the sum of bytes approach, and the corruption in the data sequence would go unnoticed.

Another error detection approach mentioned above is CRC, which generates the checkword by calculating and updating the checkword and checksum on every bit of the data string, as opposed to the unit of time approach on the checksum based on addition approach. The CRC approach ensures that the simple faults and the all zeros problems are detected. However, calculating a bit at a time is much slower process than the simple checksum approach, and requires greater processor time to calculate, especially where the calculations are done 16 or 32 bits at a time.

Therefore, there is a need in the art for an encoder and method of encoding for detection of errors and corruption of data during transmission that provides a faster solution than CRC and improved fault tolerance than checksum based on addition.

BRIEF DESCRIPTION OF THE DRAWINGS

Embodiments of the invention will now be more fully described, by way of example, with reference to the drawings, of which.

DETAILED DESCRIPTION OF EMBODIMENTS OF THE INVENTION

Figure 1:
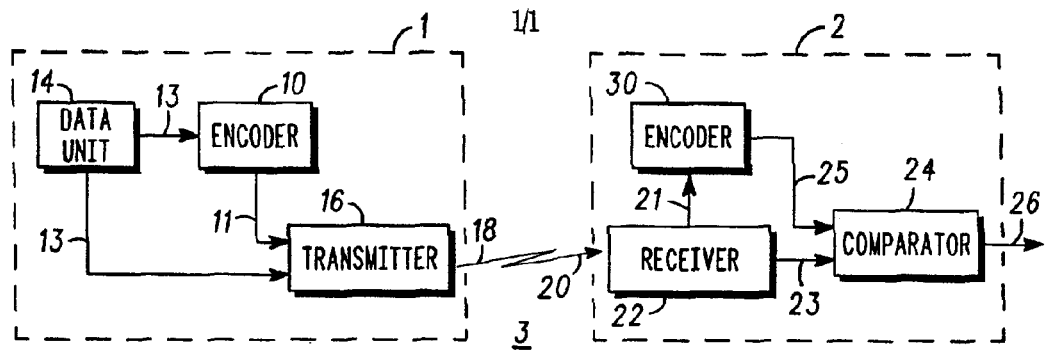
FIG. 1 shows a schematic block diagram according to an embodiment of the invention.

Referring to FIG. 1 in an embodiment of the invention, an encoder 10 is shown within an error detection system 3. In such a system, when in use, a data signal 18 is transmitted from a transmitting unit 1 to a receiving unit 2. Transmission may be, for example, by wire, RF, or other means. The data signal 18 is transmitted by transmitter 16 and comprises a data sequence 13 together with a first checkword 11. The data values in the sequence 13 are supplied and provided by a data unit 14. The checkword is calculated and provided by the encoder 10. The function of the calculation of the checkword will be discussed in detail below with reference to FIGS. 2–4.

Upon reception of the transmitted data signal at the receiver unit 2, the signal received 20 contains the transmitted data together with the transmitted first checkword 11. The receiver 22 derives from the data signal the received data sequence 21 and the transmitted first checkword 23. A second checkword 25 is calculated from the received data sequence 21 and provided by the encoder 30 performing the same calculations conducted at the transmitting unit, as described in detail below with reference to FIGS. 2–4. Of course, the system may be configured such that the transmitting unit 1 and the receiving unit 2 share the same encoder 10.

The second checkword 25 and the transmitted first checkword 23 are compared by comparator 24 to determine if the two checkwords match and provide a signal 26 indicating whether the two checkwords differ. If the two checkwords match, then the probability of data loss or corruption during transmission is low, and the data string received 21 is deemed to represent the data string transmitted 13. If on comparison the checkwords differ, then the comparator provides a signal 26 that is an indication that the data string sent 13 has been corrupted during transmission. As discussed in the background above, in such cases the receiving unit 2 may request to have the data resent, attempt to correct the data itself, or ignore the data and wait to receive additional data from a transmitting unit 1.

Figure 2:
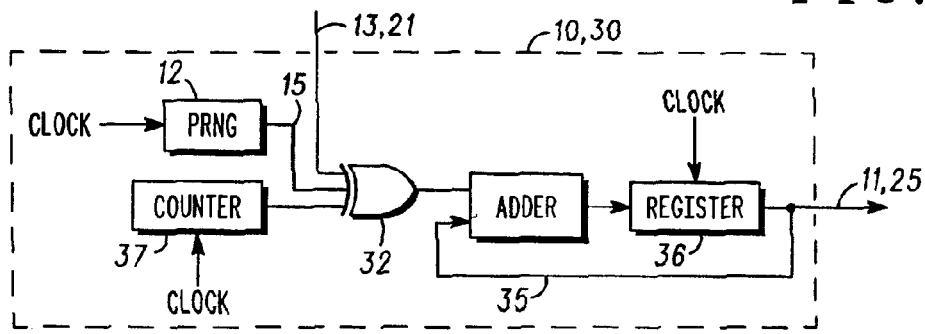
FIG. 2 shows a schematic block diagram of an encoder a according to an embodiment of the invention.
Figure 3:
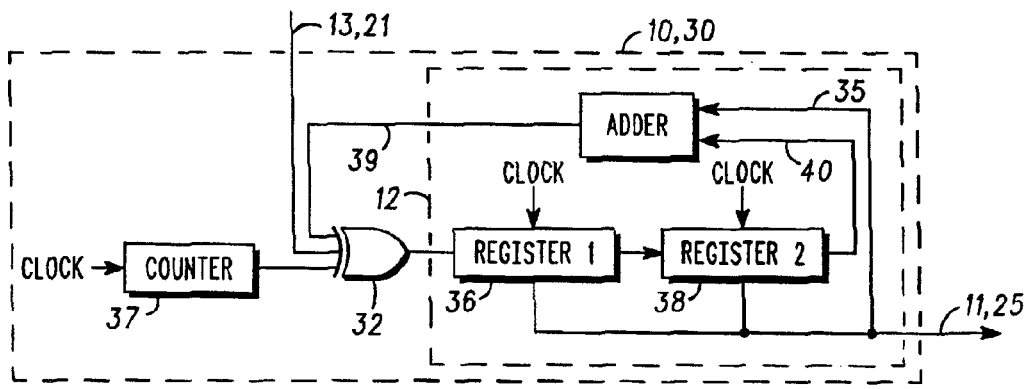
FIG. 3 shows a schematic block diagram of an encoder a according to an embodiment of the invention.
Figure 4:
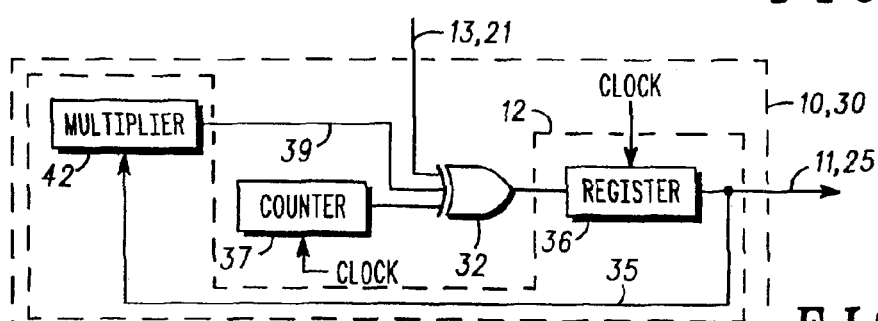
FIG. 4 shows a schematic block diagram of an encoder according to an embodiment of the invention.

The checkwords are calculated by encoder 10, which is shown by example in greater detail in FIGS. 2–4. FIGS. 2–4 illustrate embodiments of the encoder for calculating the first checkword 11 and second checkword 25. Thus, the data sequence supplied to the encoder 10 may be either the original data sequence 13 to be transmitted, or the data sequence 25 after transmission. In each of FIGS. 2–4 the encoder 10 comprises a pseudo-random number generator 12 for generating an array of pseudo random numbers 15, the same array and sequence of which may be regenerated or reproducible, repeatedly. The pseudo random number generator may be for example a fibonacci sequence generator, a multiplicative generator, or the like.

FIG. 2 illustrates an embodiment of the encoder 10,30. In this embodiment, the pseudo-random generator 12 may be a fibonacci sequence generator for calculating the first checkword 11 and/or second checkword 25. The data sequence 13,21 is passed a number of bits at a time (for example 8 or 16) through a number (equal to the number of bits being processed at a time) of 3 input exclusive or gates (XOR) 32 with the fibonacci sequence generated by the pseudo-random generator 12. The output of the XOR 32 is added together with the output 35 of register 36. A counter 37 counts the number of data processed and also feeds this into XOR 32. This counter further modifies the data based on its position in the data sequence 13,21. The pseudo-random number generator 12, register 36, and counter 37 are synchronised via a clock, as shown, a new clock pulse signifying a new set of (8 or 16) data bits are ready to be processed.

FIG. 3 illustrates an embodiment of the encoder 10,30. In this embodiment, the pseudo-random number generator 12 has been merged within the main logic for calculating the first checkword 11 and/or second checkword 25. Similarly, as discussed above with reference to FIG. 2, the data sequence 13,21 in FIG. 3 is passed through XOR 32 with the modified fibonacci sequence generated by the adder 40 and register 2. In the embodiment of FIG. 3, however, the pseudo-random sequence is modified by the data sequence 13,21 and the output of the XOR 32, to provide a modified pseudo-random number sequence 39. The output of the XOR 32 is stored in registers 36,38, wherein register 1 (36) stores the current value in the pseudo-random number sequence, and register 2 (38) stores the previous value in the pseudo-random number sequence. The output from register 2 (38) is added together with the output of register 2 (36) to form the next value of the pseudo-random number generator 12. Of course, the initial starting values in the registers 36,38 must be fixed at the same value for encoding and decoding, until replaced with a value from the XOR 32. A counter 37 counts the number of data processed in the same way as in FIG. 2. The registers 36,38, and counter 37 are synchronised via a clock, as in FIG. 2.

FIG. 4 illustrates an embodiment of the encoder 10,30. In this embodiment, a multiplicative pseudo-random number generator 12 is used. Similarly, as discussed above with reference to FIGS. 2 and 3, the data sequence 13,21 in FIG. 4 is passed through XOR 32 with the multiplicative sequence generated by the multiplier 40. In the embodiment of FIG. 4, the pseudo-random number sequence is created by multiplying the output of the register (11,25) by a non-zero constant, for example 69069, to provide a modified pseudo-random number sequence 39. The output of the XOR 32 is stored in register 36, wherein register 36 stores the current output value. Of course, the initial starting value in the register 36 is fixed at a known value, until replaced with a value from the XOR 32. A counter 37 counts the number of data processed as in FIG. 2. The register 36, and counter 37 are synchronised via a clock, as in FIG. 2.

It will be appreciated that although the particular embodiments of the invention have been described above, various other modifications and improvements may be made by a person skilled in the art without departing from the scope of the present invention.

What is claimed is:

1. An encoder comprising:
   a pseudo random number generator for generating a reproducible array of pseudo random numbers;
   calculating means for calculating a checkword, having an exclusive OR gate for values of the array of pseudo random numbers generated and a data sequence provided by a data unit to pass through, and at least one register synchronised with said pseudo random number generator to store the output of the exclusive OR gate, and update the checkword; and
   a counter that is operable to count the number of received words of data, wherein an output of the counter, an output of the pseudo random number generator, and the data sequence are coupled together at an input of the exclusive OR gate to be encoded together.

2. An encoder as claimed in claim 1 wherein the pseudo random number generator generates an array of pseudo random numbers that is a function of the data sequence.

3. An encoder as claimed in claim 1 wherein the pseudo random number generator, register, and counter are synchronized.

4. An encoder as claimed in claim 1 further comprising transmitting means which, in use, transmits a signal to a receiving unit, the data sequence provided by the data unit together with a first checkword, in a form which enables the receiving unit to derive from the data signal, the received data sequence and the first checkword.

5. An encoder as claimed in claim 1 for use in a data error detection system comprising:
   a receiving unit for receiving the transmitted signal; and
   comparing means for comparing a second checkword with the first checkword for providing an indication of an error occurring in the data sequence during transmission, the second checkword provided by calculating means based on the data sequence actually received by the receiving unit and the array of pseudo random numbers generated.

6. An encoder as claimed in claim 1 further comprising an adder coupled between an output of exclusive OR gate and an input of the register of the calculating means, wherein an output of the register is added with the output of the exclusive OR gate in the adder.

7. An encoder as claimed in any of claim 1 further comprising an adder coupled to an input of the exclusive OR gate and an output of the register of the calculating means, wherein an output of the register is added with the output of the exclusive OR gate in the adder.

8. An encoder as claimed in claim 1 for use in automotive application.

9. A method for encoding data comprising the steps of:
   generating an array of pseudo random numbers with a pseudo random number generator;
   calculating by calculating means a checkword, calculating means having an exclusive OR gate for values of the array of pseudo random numbers generated and a data sequence provided by a data unit to pass through, and at least one register synchronised with said pseudo random number generator to store the output of the exclusive OR gate, and update the checkword; and
   providing a counter that is operable to count the number of received words of data, wherein an output of the counter an output of the pseudo random number generator, and the data sequence are coupled together at an input of the exclusive OR gate; and
   encoding the output of the counter, the output of the pseudo random number generator, and the data sequence together.

10. A method for encoding data, as claimed in claim 9 further comprising the step of transmitting by transmitting means which, in use, transmits a signal to a receiving unit, the data sequence provided by the data unit together with a first checkword, in a form which enables the receiving unit to derive independently from the data signal, the received data sequence and the first checkword.

11. A method for encoding data as claimed in claim 9 further comprising the steps of:

receiving the transmitted signal by a receiving unit; and competing by comparing means a second checkword with the first checkword for providing an indication of an error occurring in the data sequence during transmission, the second checkword provided by calculating means based on the data sequence actually received by the receiving unit and the array of pseudo random numbers generated.

12. A method for encoding data as claimed in claim 9 further comprising a step of synchronizing the pseudo random number generator, register, and counter.

13. A method for encoding data s claimed in claim 9 wherein the providing step includes an adder coupled between an output of the exclusive OR gate and an input of the register of the calculating means, and further comprising the step of adding an output of the register with the output of the exclusive OR gate in the adder.

14. A method for encoding data as claimed in claim 9 wherein the providing step includes an adder coupled to an input of the exclusive OR gate and an output of the register of the calculating means, and further comprising the step of adding an output of the register with the output of the exclusive OR gate in the adder.

* * * * *